United States Patent
Yang et al.

(10) Patent No.: US 11,657,040 B2
(45) Date of Patent: May 23, 2023

(54) BLOCKCHAIN MACHINE NETWORK ACCELERATION ENGINE

(71) Applicant: XILINX, INC., San Jose, CA (US)

(72) Inventors: Ji Yang, San Jose, CA (US); Haris Javaid, Singapore (SG); Sundararajarao Mohan, Sunnyvale, CA (US); Gordon John Brebner, Monte Sereno, CA (US)

(73) Assignee: XILINX, INC., San Jose, CA (US)

( * ) Notice: Subject to any disclaimer, the term of this patent is extended or adjusted under 35 U.S.C. 154(b) by 231 days.

(21) Appl. No.: 17/084,942

(22) Filed: Oct. 30, 2020

(65) Prior Publication Data

US 2022/0138178 A1 May 5, 2022

(51) Int. Cl.
*G06F 16/23* (2019.01)
*G06F 12/0875* (2016.01)

(52) U.S. Cl.
CPC ...... *G06F 16/2379* (2019.01); *G06F 12/0875* (2013.01); *G06F 2212/45* (2013.01)

(58) Field of Classification Search
CPC .......................... G06F 16/2379; G06F 12/0875
See application file for complete search history.

(56) References Cited

U.S. PATENT DOCUMENTS

| | | | |
|---|---|---|---|
| 10,375,105 B2 | 8/2019 | Kozloski et al. | |
| 10,762,479 B2 | 9/2020 | Hyun et al. | |
| 11,269,859 B1* | 3/2022 | Luedtke | G06F 16/245 |
| 2018/0329617 A1* | 11/2018 | Jones | G06F 3/04847 |
| 2019/0370806 A1 | 12/2019 | Wang et al. | |
| 2020/0142965 A1* | 5/2020 | Weldemariam | G06F 16/27 |
| 2020/0143088 A1 | 5/2020 | Sunkavalli et al. | |
| 2020/0145190 A1* | 5/2020 | Venkataramappa | H04L 9/3239 |
| 2020/0322128 A1* | 10/2020 | Hu | H04L 9/3218 |
| 2020/0328885 A1* | 10/2020 | Tola | G06F 21/6218 |
| 2020/0336297 A1* | 10/2020 | Zhuo | G06F 16/2379 |
| 2021/0184864 A1* | 6/2021 | Wentz | H04L 9/3073 |
| 2021/0303713 A1* | 9/2021 | Sreedhar | H04L 9/0861 |

* cited by examiner

*Primary Examiner* — Eliyah S. Harper
(74) *Attorney, Agent, or Firm* — Patterson + Sheridan, LLP

(57) ABSTRACT

Embodiments herein describe a hardware accelerator (e.g., a network acceleration engine) for a blockchain machine or node. The hardware accelerator parses packets containing separate components of a block of transactions to generate data to perform a validation process. To avoid the latency that comes with using software, the embodiments herein describe a protocol processor in the hardware accelerator that parses the packets and prepares the data so it can be consumed by downstream components in the accelerator without software intervention. These downstream components can then perform a validation operation to validate one or more transactions before those transactions are committed (i.e., added) to a ledger of a permissioned blockchain.

20 Claims, 8 Drawing Sheets

BLOCKCHAIN MACHINE NETWORK ACCELERATION ENGINE

TECHNICAL FIELD

Examples of the present disclosure generally relate to a hardware accelerator for a node in a blockchain.

BACKGROUND

Hyperledger Fabric is an open-source, enterprise-grade implementation platform for permissioned blockchains. The transaction flow in Hyperledger Fabric follows the execute-order-validate model, where a transaction is executed first, then ordered into a block, which is finally validated and committed to the ledger (along with a state database to keep the global state of the blocks committed so far). Consequently, a Fabric network includes different types of nodes, such as peers, orderers, clients, etc., where each node has an identity provided by the Membership Service Provider (MSP).

Permissioned blockchains (like Hyperledger Fabric, Quorum, Corda, and others) are blockchain networks that require access to be part of. These blockchains require transactions to be validated before they are added to the blockchain's ledger. However, the validation process must be performed by certain nodes which often experience a bottleneck when having to validate multiple transactions. This bottleneck can limit the ability of the blockchain to quickly commit new transactions.

SUMMARY

One embodiment describes a computing system that includes a processor, a memory storing a ledge of a blockchain, and a hardware accelerator. Thus hardware accelerator is configured to receive a plurality of packets corresponding to a block of transactions to be committed to the ledger, generate hashes for different components in the block of transactions, and upon determining the hashes match previously calculated hashes, generating tasks to validate the block of transactions in the hardware accelerator. Further, one of the processor or the hardware accelerator is configured to, upon determining the block of transactions is valid, commit the block of transactions to the ledger.

Another embodiment described herein is an integrated circuit for accelerating a validation process for a blockchain. The integrated circuit includes a data insertor configured to receive a plurality of packets corresponding to a block of transactions to be committed to a ledger of the blockchain, a hash calculator configured to generate hashes for different components in the block of transactions, a hash checker configured to determine that the hashes match previously calculated hashes, and a task generator configured to generate tasks to validate the block of transactions.

Another embodiment described herein is a method that includes receiving, at a hardware accelerator, a plurality of packets corresponding to a block of transactions to be committed to a ledger of a blockchain, calculating, at the hardware accelerator, hashes for different components in the block of transactions, determining, at the hardware accelerator, that the hashes match previously calculated hashes, and generating, at the hardware accelerator, tasks to validate the block of transactions.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
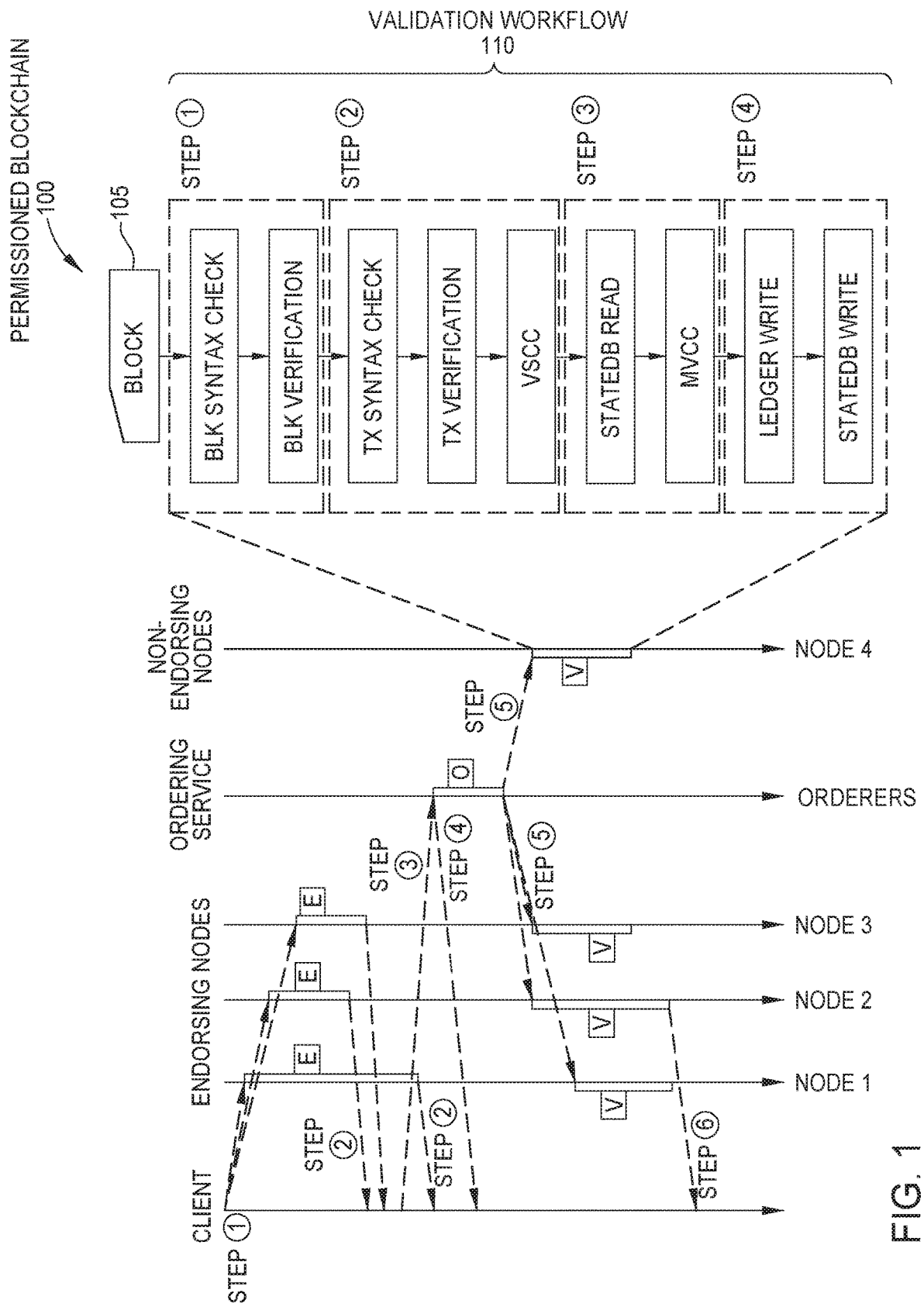
FIG. 1 is a timing chart corresponding to a permissioned blockchain, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a hardware accelerator (e.g., a network acceleration engine) for a blockchain machine or node. The hardware accelerator parses packets containing separate components of a block of transactions to generate data to perform a validation process. That is, data transmitted using a network protocol (e.g., TCP (Transmission Control Protocol)) is typically ill suited to be used by a hardware accelerator without the packets first being processed by software. To avoid the latency that comes with using software, the embodiments herein describe a protocol processor in the hardware accelerator that parses the packets and prepares the data so it can be consumed by downstream components in the accelerator without software intervention. These downstream components can then perform a validation operation to validate one or more transactions before those transactions are committed (i.e., added) to a ledger of a permissioned blockchain.

The blockchain may include multiple peer-nodes, each of which contains standard software running on a server or container. Some peer-nodes, known as validator nodes are often the main bottleneck for system performance because they need to validate a block of several tens or hundreds of transactions quickly before those transactions can be committed into the blockchain ledger. Instead of validating the block of transactions using software, the hardware accelerator can validate the transactions in a fraction of the time. The peer-node software then gathers the validation results from the hardware accelerator and combines the results with received block data to derive the block, which is then committed to the stored ledger. In an experimental setup, a node with the hardware accelerator, when coupled to a networking acceleration engine, achieved more than 10× improvement in transaction commit throughput compared to a software only peer executing on a multi-core server.

FIG. 1 is a timing chart corresponding to a permissioned blockchain 100, according to an example. While the timing chart of the permissioned blockchain 100 in FIG. 1 specifically pertains to the Hyperiedger Fabric, the embodiments herein can apply to any type of permissioned blockchain. Further, the embodiments herein may also apply to non-permissioned blockchains that perform a validation process on transactions before those transactions are committed to the ledger. Thus, the Hyperledger Fabric is provided as just one example of a suitable blockchain network that can benefit from the hardware accelerator described below.

The transaction flow in the blockchain 100 follows an execute-order-validate model, where a transaction is executed first, then ordered into a block, which is finally validated and committed to the ledger (along with a state database to keep the global state of the blocks committed so far). Consequently, the permissioned blockchain 100 includes different types of nodes, such as peers, orderers, clients, etc., where each node has an identity provided by the MSP. This identify can be provided in the form a certificate.

The client can be any entity that submits a transaction to be committed on the blockchain 100. For example, if the blockchain 100 is used by a financial institution to track money transfers, the client may submit a transaction to move funds from a first account to a second account (at the same financial institution or a different institution). At step 1, the client submits a transaction to be committed to the blockchain. Specifically, the transaction is received on multiple endorsing nodes (or peers). An endorsing node both executes/endorses transactions and validates/commits blocks to the ledger. Each endorsing node executes the transaction against its own state database, to compute the read-write set of the transaction (marked as E in FIG. 1). The read set is the keys accessed and their version numbers, while the write set is the keys to be updated with their new values.

If the endorsement process is successful (i.e., there are no errors), at step 2, the endorsing nodes add their endorsement to the transaction and return the transaction to the client. After the client has gathered a sufficient number of endorsements, at step 3, the client asks an ordering service to submit the transaction to a validation process. In one embodiment, the ordering service includes orderers (e.g., computing nodes) which use a consensus mechanism to establish a total order for the transactions. Multiple pluggable consensus mechanisms are available, such as Raft and Apache Kafka/Zookeeper based consensus mechanisms.

At step 4, the ordering service responds back to the client after the transaction has been accepted for inclusion into a block (step 4). The ordering service then creates a block 105 of transactions from the ordered transactions. In one embodiment, the ordering service creates the block 105 from the ordered transactions when either a user-configured timeout has expired or user-configured limit on block size is reached.

Once a block 105 is created, the ordering service broadcasts it to all the endorsing and non-endorsing nodes through, e.g., a Gossip protocol at step 5. Each node validates all the transactions in the block 105 and then commits the block to the ledger and state database (marked as V). Finally, one of the nodes sends a notification to the client that the transaction has been committed or whether the transaction was marked as invalid or valid in the ledger (step 6).

FIG. 1 shows a validation workflow 110 of the validation phase in more detail on the righthand side. The workflow 110 shows four steps which are performed on every node that receives the block 105. On receiving the block 105 of transactions from the ordering service (or a lead node) through the Gossip protocol, at step 1, the node checks the syntactic structure of the block and verifies its signature, and then sends it through a pipeline of various operations which are described in more detail blow. In step 2, each transaction in the block is syntactically checked and its signature is verified. Then validation system chaincode (VSCC) is run on each transaction where the endorsements are validated and the endorsement policy of the associated chaincode is evaluated. A transaction is marked as invalid if its endorsement policy is not satisfied.

In step 3, a multi-version concurrency control (MVCC) check is performed. This check ensures that there are no readwrite conflicts between the valid transactions. In other words, it avoids the double-spending problem where two transactions are committed when only one transaction was intended. The read set of each transaction is computed again by accessing a state database (illustrated as "statedb" in FIG. 1) and is compared to the read set from the endorsement phase. If these read sets are different, then some other transaction (either in this block 105 or an earlier block) has already modified the same keys, and hence this transaction is marked as invalid.

In the final step 4, the block is committed to the stored ledger at the node. In one embodiment, the entire block is first written to the ledger with its transactions' valid/invalid flags. Then, the write sets of the valid transactions are committed to the state database.

Figure 2A:
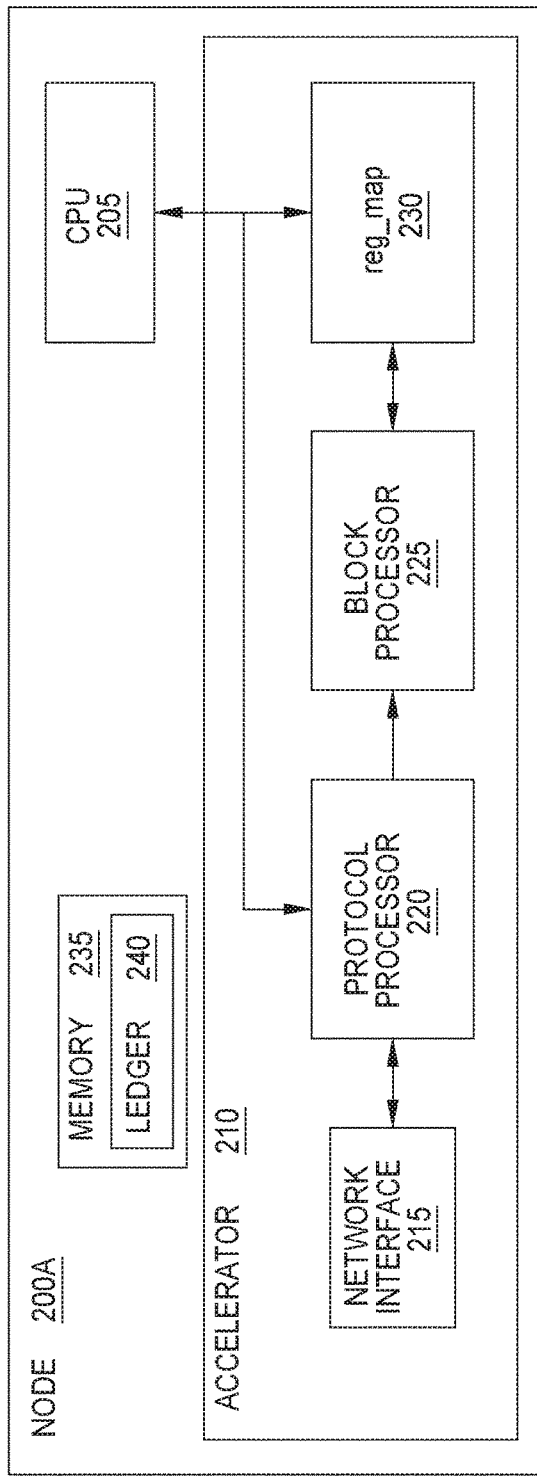
FIGS. 2A and 2B are block diagrams of nodes in a blockchain with a hardware accelerator, according to an example.
Figure 2B:
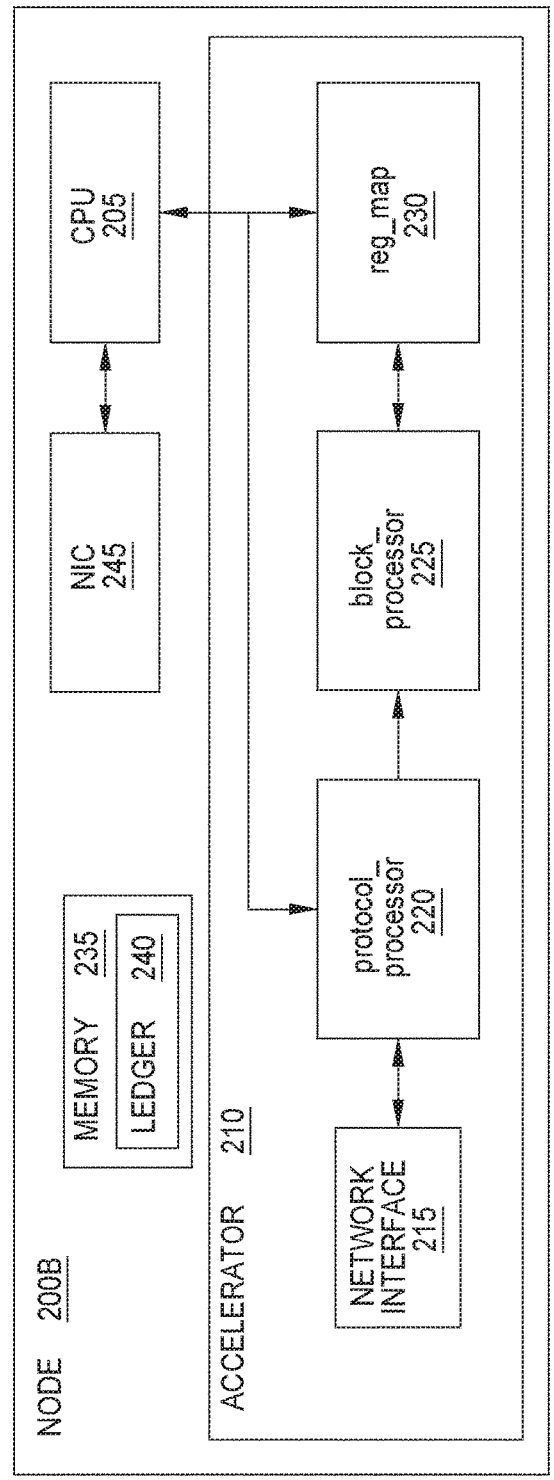

FIGS. 2A and 2B are block diagrams of nodes 200 in a blockchain with a hardware accelerator 210, according to an example. In one embodiment, the node 200 is any computing system that performs a validation process when committing transactions to a blockchain. For example, the node 200 may be an endorsing or non-endorsing node or peer as shown in FIG. 1. In one embodiment, the node 200 is a server or other computing system.

In FIG. 2A, the node 200A includes a CPU 205, the hardware accelerator 210, and memory 235. The CPU 205 represents any number of processors that each can contain any number of processing cores. The memory 235 represents volatile memory, non-volatile memory (e.g., a hard disk drive), and combinations thereof. As shown, the memory 235 stores a ledger 240 which lists the committed transactions of a blockchain.

The hardware accelerator 210 contains various circuit elements for performing the validation workflow 110 illustrated in FIG. 1. In one embodiment, the hardware accelerator 210 is an integrated circuit. In another embodiment, the hardware accelerator 210 is a board (e.g., a printed circuit board (PCB) such as a PCIe card) on which one or more integrated circuits are mounted. In one embodiment, the integrated circuit is a field programmable gate array (e.g., FPGA) or a system on a chip (SoC) that comprises programmable logic. In this example, the various circuit blocks in the accelerator 210 are implemented in programmable logic. However, in another embodiment, the integrated circuit may be an application specific integrated circuit (ASIC) where the circuit blocks of the accelerator 210 are implemented only in hardened circuitry. While using an FPGA and SoC with programmable logic gives the accelerator 210 the flexibility to be reprogrammed if the validation process is changed, using an ASIC may save space.

The accelerator 210 includes a network interface 215 for receiving Ethernet packets containing data regarding the transactions, a protocol processor 220 for reformatting the data so it can be consumed by downstream components, a block processor 225 for performing the validation workflow, and a register map 230 (reg_map) (e.g., memory registers) which store the results of the validation. In general, these hardware blocks work together to validate a received block of transactions. That is, the network interface 215 receives multiple packets which include data corresponding to a block of transactions. Because this data may be in a format that is unsuitable for processing, the protocol processor 220 can reformat and output the data for the block processor 225 for consumption. While the block processor 225 performs most of the steps in the validation workflow, some of these steps may be performed by the protocol processor 220 and the register map 230. Further, because the ledger 240 is stored in the memory 235 (which may not be directly accessible by the accelerator 210), the node 200A may rely on the CPU 205 to commit validated transactions to the ledger 240. That is, the accelerator 210 can store the validation results in the register map 230 which the CPU 205 can evaluate and then commit the transactions the ledger. That is, in one embodiment all the transactions are committed to the ledge but the validation flags store the information about which ones were valid and which were invalid. However, for the state database (which is discussed below), only successfully validated transactions are committed. While most of the validation is performed in the hardware accelerator 210, committing the transactions to the ledger 240 may be performed by software executing on the CPU 205.

FIG. 2B illustrates a node 200B that is the same as the node 200A in FIG. 2A except for the addition of a network interface card (NIC) 245. In one embodiment, the NIC 245 provides the node 200B with the ability to determine what network traffic flows through the accelerator 210 and what network traffic flows through the NIC 245. In one embodiment, all traffic related to the blockchain may be sent through the accelerator 210 while received network traffic that is not related to the blockchain is processed by the NIC 245. In contrast, in node 200A all the network traffic received by the node 200A (whether blockchain or non-blockchain traffic) may be received at the accelerator 210. For example, the protocol processor 220 may forward the network traffic related to validation to the block processor 225 but forward all other traffic to the CPU 205.

In another embodiment, the accelerator 210 receives only the network traffic related to validating transactions at the accelerator 210 while all other traffic (whether it is other types of blockchain traffic such as an endorsement request, or non-blockchain traffic) is received and processed by the NIC 245.

In yet another embodiment not shown in either FIG. 2A or 2B, the accelerator 210 may perform all blockchain operations without the aid of the CPU 205. In that embodiment, the NIC 245 and the CPU 205 are not used to perform blockchain tasks, although the CPU 205 may be used to configure or control the accelerator 210. In this scenario, all network traffic goes through the accelerator 210 which processes the blockchain related packets but forwards other packets to/from the CPU 205.

Figure 3:
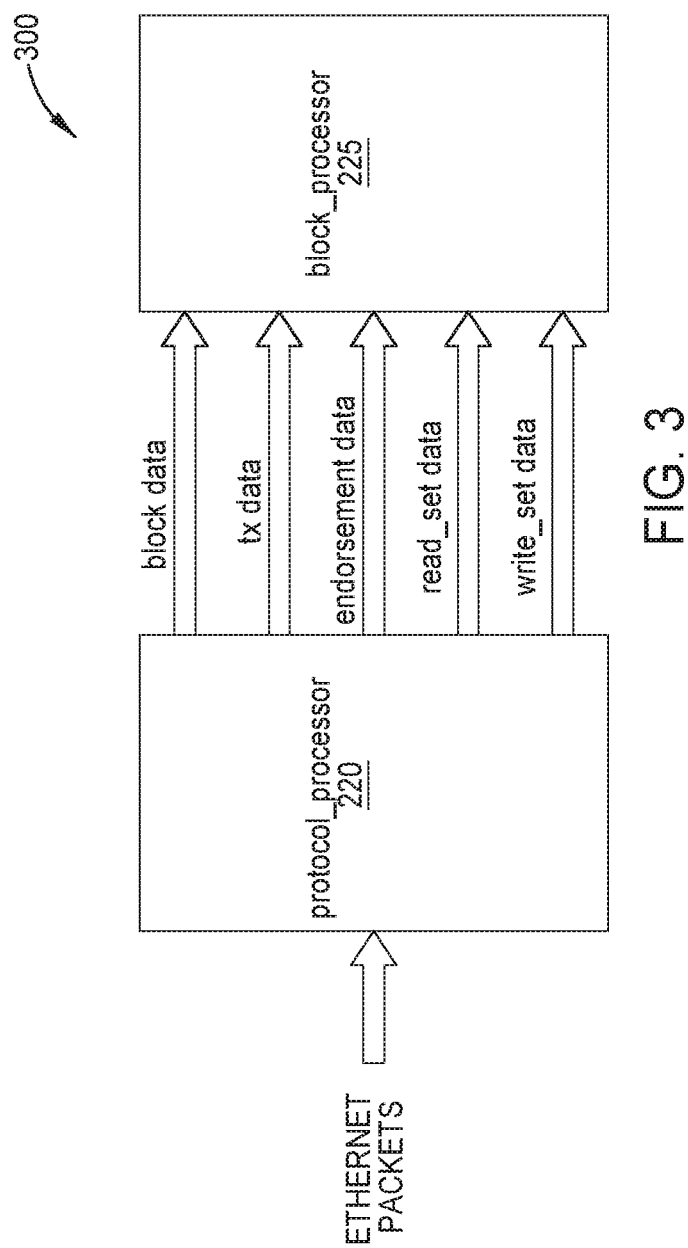
FIG. 3 illustrates an interface between a protocol processor and a block processor in the hardware accelerator, according to an example.

FIG. 3 illustrates an interface 300 between a protocol processor and block processor in the hardware accelerator, according to an example. In this example, the interface 300 is used to transmit block data, transaction data (labeled as tx data in FIG. 3), endorsement data, read set data, and write set data to the block processor 225. That is, the protocol processor 220 receives Ethernet packets from other nodes in the blockchain (e.g, from orderers in the ordering service) that contain the information used to validate a block of transactions. The protocol processor 220 then reformats/parses the data so that it can be consumed by the block processor 225.

Figure 4:
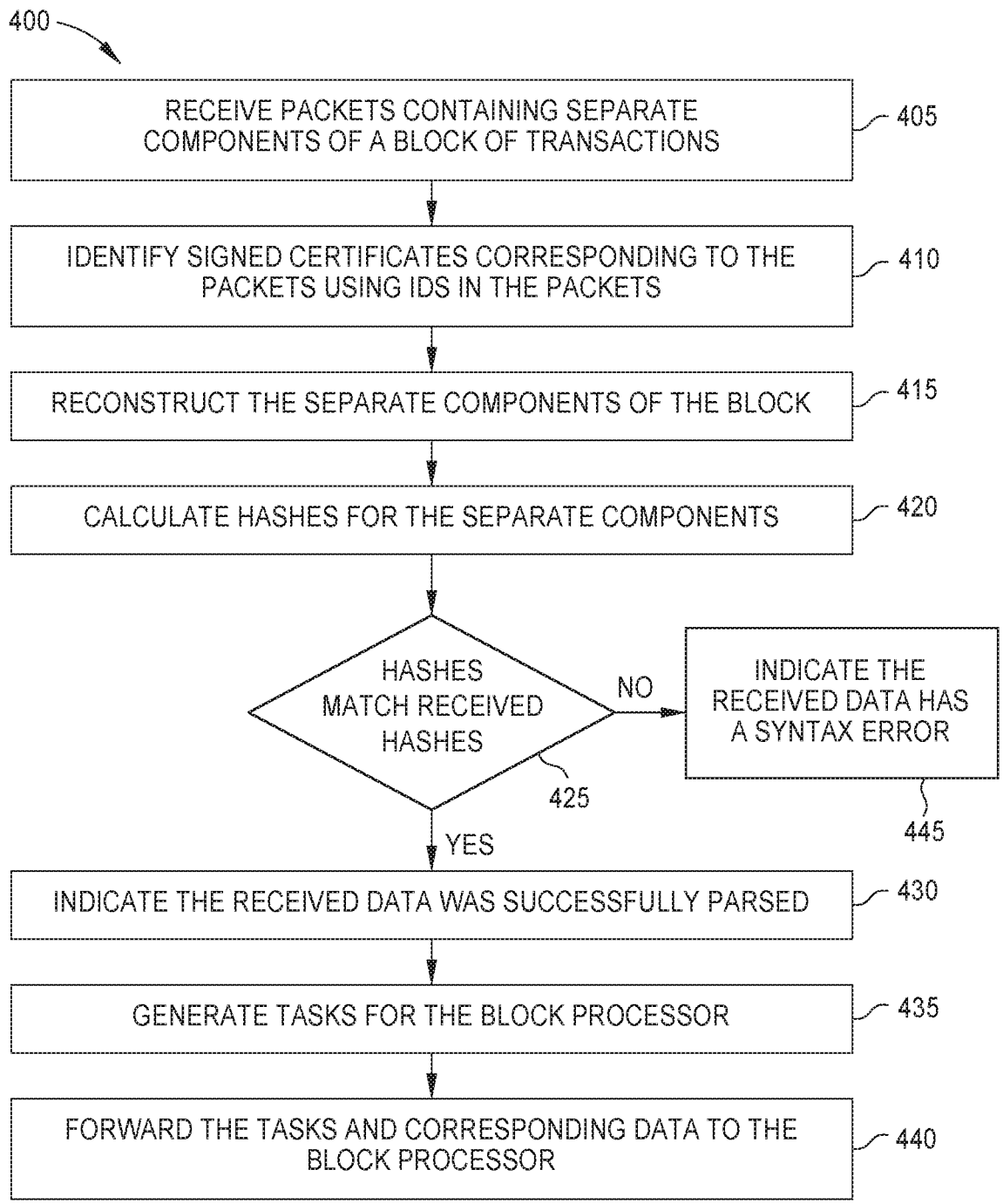
FIG. 4 is a flowchart for parsing packets to prepare data for hardware processing, according to an example.

FIG. 4 is a flowchart of a method 400 for parsing packets to prepare data for hardware processing, according to an example. For ease of explanation, the blocks in the method 400 are discussed in parallel with the Figures below.

At block 405, the network interface in the accelerator receives packets containing separate components of a block of transactions. Because the block is typically too large to send in a single packet (e.g., a block can be more than a megabyte), the software applications relies on the network protocol or a software driver to chunk the block into multiple packets. However, the network protocol/driver typically has no knowledge of how the data is structured in the block, and thus, data is typically transmitted in an ad hoc manner. This makes it difficult if not impossible for a hardware accelerator to then parse the received packets and reconstruct the block of transactions. However, the embodiments herein describe techniques for transmitting the block of transactions so that a hardware accelerator can parse the packets in order to reconstruct the different components in the block of transactions.

Figure 5A:
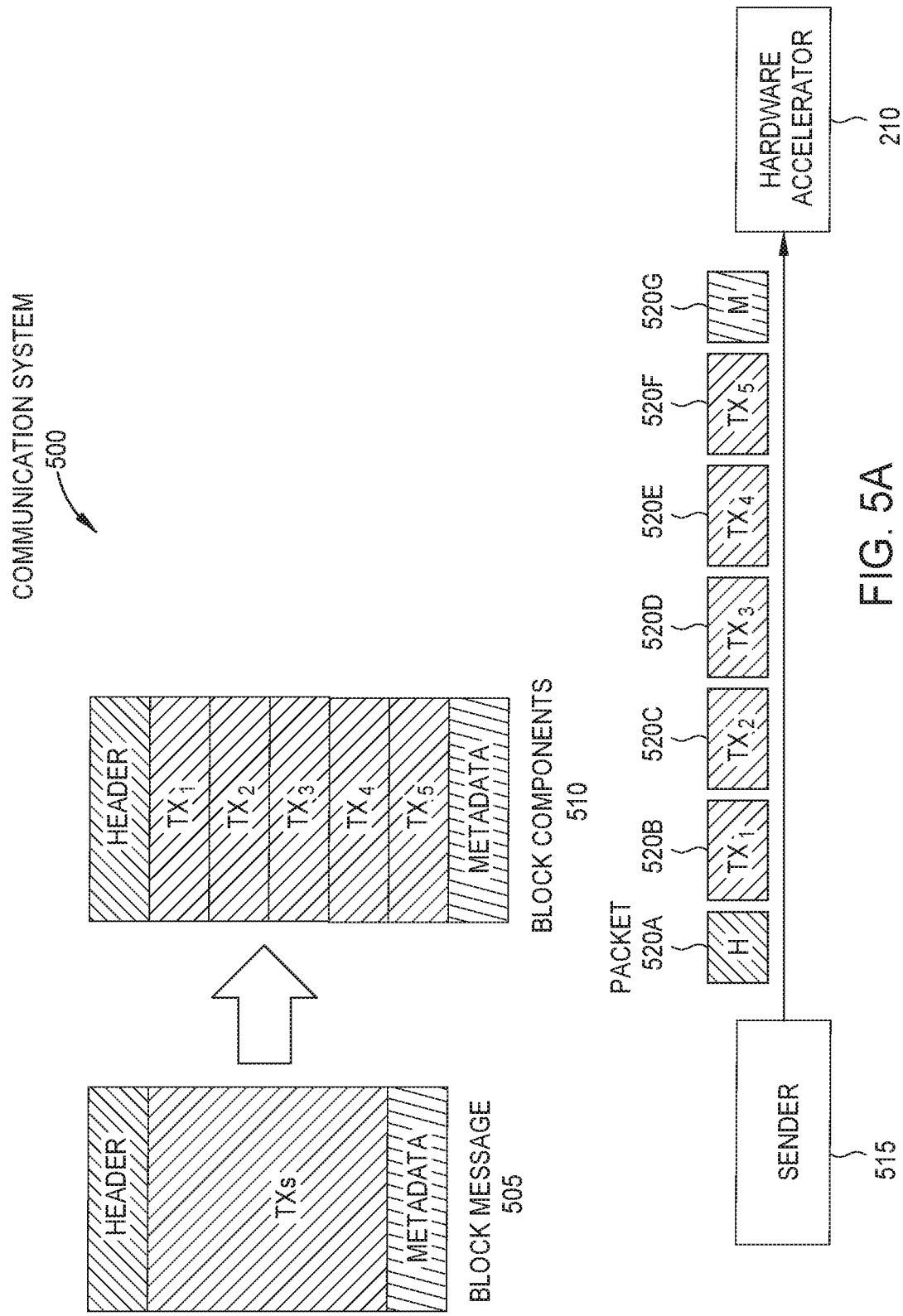
FIG. 5A illustrates transmitting separate packets for each component in a block of transactions, according to an example.

FIG. 5A illustrates transmitting separate packets for each component in a block 505 of transactions, according to an example. Specifically, FIG. 5A illustrates a communication system 500 where a sender 515 (e.g., an orderer or other peer node in the blockchain) transmits packets 520 to the hardware accelerator 210 so that these packets can be accurately parsed so that the block message 505 can be reconstructed. To do so, software in the sender 515 divides the block message 505 into its separate block components 510 shown here as a header, transactions (TX) 1-5 and metadata. That is, rather than relying on a network protocol or driver to determine how to divide the data in the block message 505 into separate packets, the software on the sender 515 (which is aware of the structure of the block 505) can separate the block into its components 510.

FIG. 5A illustrates the sender 515 transmitting the packets 520A-520G to the hardware accelerator 210 over a network, e.g., a private or public network, such as the Internet. As shown, each packet 520 includes only one of the components 510—i.e, the packet 520A includes the header of the block 505, the packets 520B-520F each include one of the transactions, and the packet 520G includes the metadata of the block 505. Without the software dividing up the block 505 into its components 510, the network protocol or driver may have sent a first packet that included the header and a portion of TX1, a second packet that included the remaining data of TX and a portion of TX2, and so forth. This unpredictable bifurcation of the different components 510 in the block 505 may make it difficult to design a hardware accelerator 210 to parse the data so the block 505 can be reconstructed.

Also, while not shown in FIG. 5A, the sender 515 may remove signed certificates associated with the components 510. These certificates may be used to validate the block 505 and the transactions within the block. However, these certificates (e.g., x509 certificates) are large, which means transmitting them to the accelerator 210 requires a significant amount of bandwidth. In one embodiment, the sender 515 removes the certificates from the block 505 before forming the packets 520 that are then sent to the accelerator 210. Instead, the sender 515 can replace the certificates with an ID (e.g., an 8-bit code). In one embodiment, the sender 515 transmits the certificates separately to the accelerator 210 one time which can then store the certificates in a cache for later retrieval. In this manner, the certificates are sent once rather than repeatedly if they are associated with multiple components 510 in the block 505.

Figure 5B:
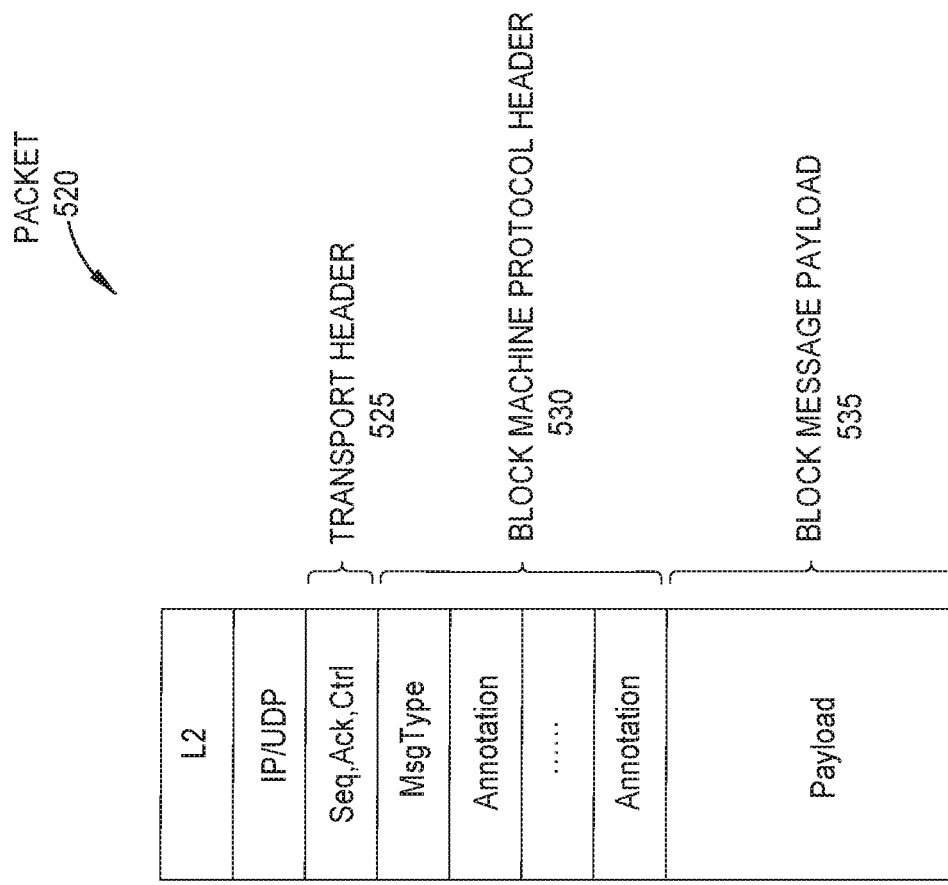
FIG. 5B illustrates a packet for sending an individual component in a block, according to an example.

FIG. 5B illustrates a packet 520 for sending an individual component in a block, according to an example. The 520 includes L2 and IP/UDP data, a transport header 525, a block machine protocol header 530, and a block message payload 535. The transport header 525 can include a sequence number (Seq), acknowledgement number (Ack), and control data (Ctrl). The sequence number indicates where the packet is in the sequence of packets representing the block 505. The acknowledgement number is used by the accelerator 210 when generating an Ack packet to transmit back to the sender 515. The control data can include such information as the application level protocol failure and receiver buffer status.

The block machine protocol header 530 includes a message type (MsgType) and annotations. The message type indicates whether the data in the payload 535 is a block header, a transaction, or metadata. The annotations point out the position of important data. For example, the annotations may include a pointer that points to relevant data in the packet 520 (e.g., where certain data in the payload 535 can be found) and a locator that points to data in a cache or in a different packet (but same block). In one embodiment, a locator in the annotations is used to mark the ID for the packet 520. The payload 535 can include the data corresponding to the particular component 510 being sent in the packet—i.e., metadata from the block 505.

Because each packet 520 contains one of the components 510 of the block 505, this provides the advantage that the accelerator 210 can begin to process the data before receiving all the packets 520 of the block. That is, instead of waiting for software to receive all the packets and then reconstruct the block 505 for validation, the accelerator 210 can process the transactions as they come in. For example, the protocol processor can parse the packet 520B corresponding to TX1 before the packet 520C containing TX2 is received at the accelerator 210. Thus, the accelerator 210 can begin to process the transactions much sooner than a software solution where all the packets must be received before the transactions can be reconstructed and validated.

Figure 6:
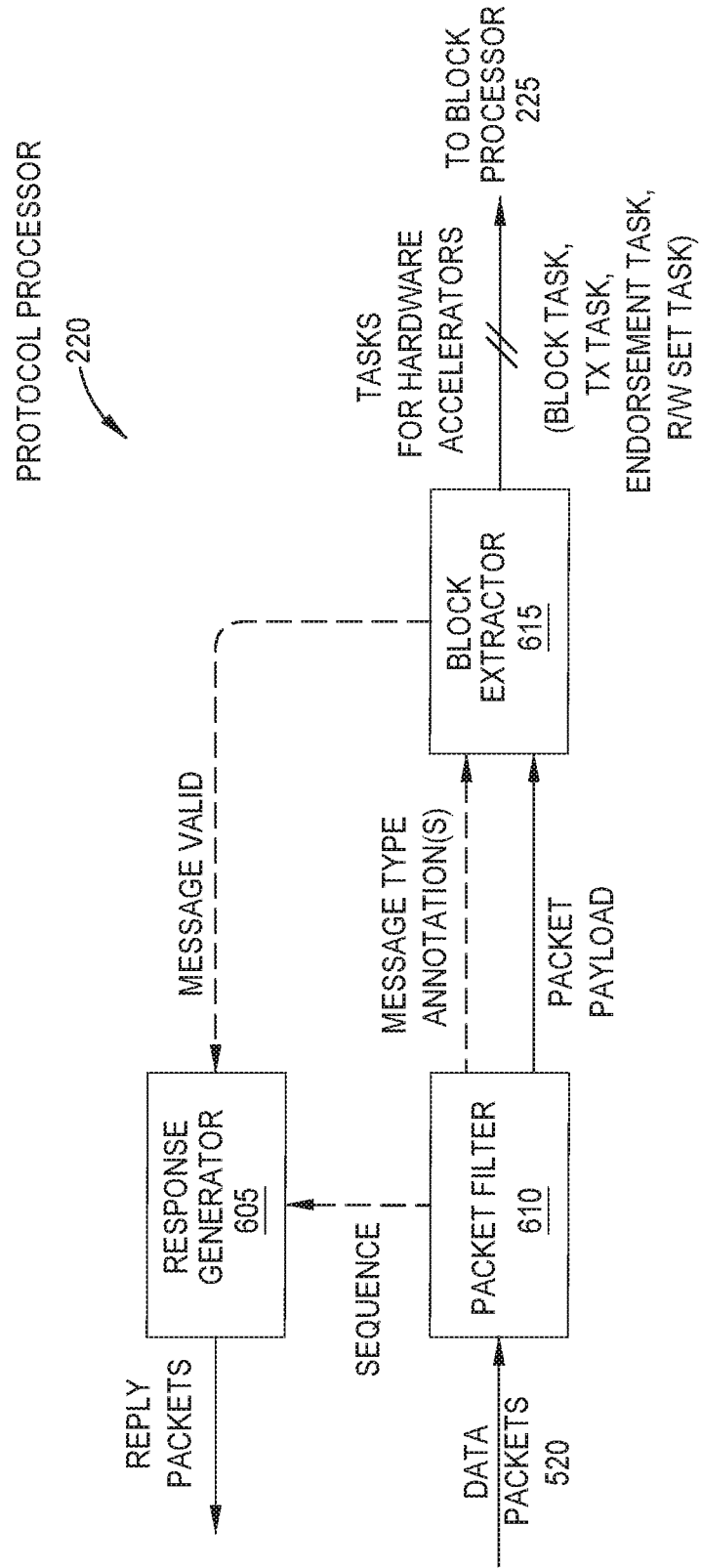
FIG. 6 is a block diagram of a protocol processor in a hardware accelerator, according to an example.

FIG. 6 is a block diagram of the protocol processor 220 in the hardware accelerator, according to an example. As shown, the data packets 520 are received at a packet filter 610 that parses the Levels 4-7 (L4-L7) packet headers (e.g., the block machine protocol header 530) to extract the message type and the annotations. The message type may include the block start, the block metadata, transaction, etc. The annotations for the message payload can include position of the block header, the location of the block signatures, block ID, transaction data start, channel name, transaction ID, chaincode name, creator certificate authority (CA) ID, transaction action, transaction CA ID, contract name, contract input, endorser action, read/write set, endorser list, transaction signature, orderer CA ID, orderer signature, certificate ID, certificate public key data, state valid since information, state valid through information, and the like. The packet filter 610 also identifies the sequence number in the transport header and forwards this number to a response generator 605 which transmits response packets (e.g., an acknowledgement packet) back to the sender (e.g., the orderer).

The packet filter 610 forwards the message type, annotations, and packet payload to a block extractor 615 which processes the message payload based on the annotations and extracts relevant data for the block processor 225. The block extractor 615 also provides a message valid signal for the response generator 605 so the generator 605 can inform the sender whether the block and its transactions are valid or invalid. The details of the block processor 225 are discussed in the remaining portions of the method 400 and the figures below.

Returning to the method 400, at block 410 the block extractor in the protocol processor identifies signed certificates corresponding to the packets using IDs in the packets. As mentioned above, the sender may strip the certificates from the block before transmitting the block in a plurality of packets to the hardware accelerator. This may be done since the certificates are large, and rarely change. Thus, replacing the certificates with a much smaller ID or key in the packets that refer to the certificates may save significant bandwidth and ensure that each component in the block of transactions can be sent in a single packet.

Figure 7:
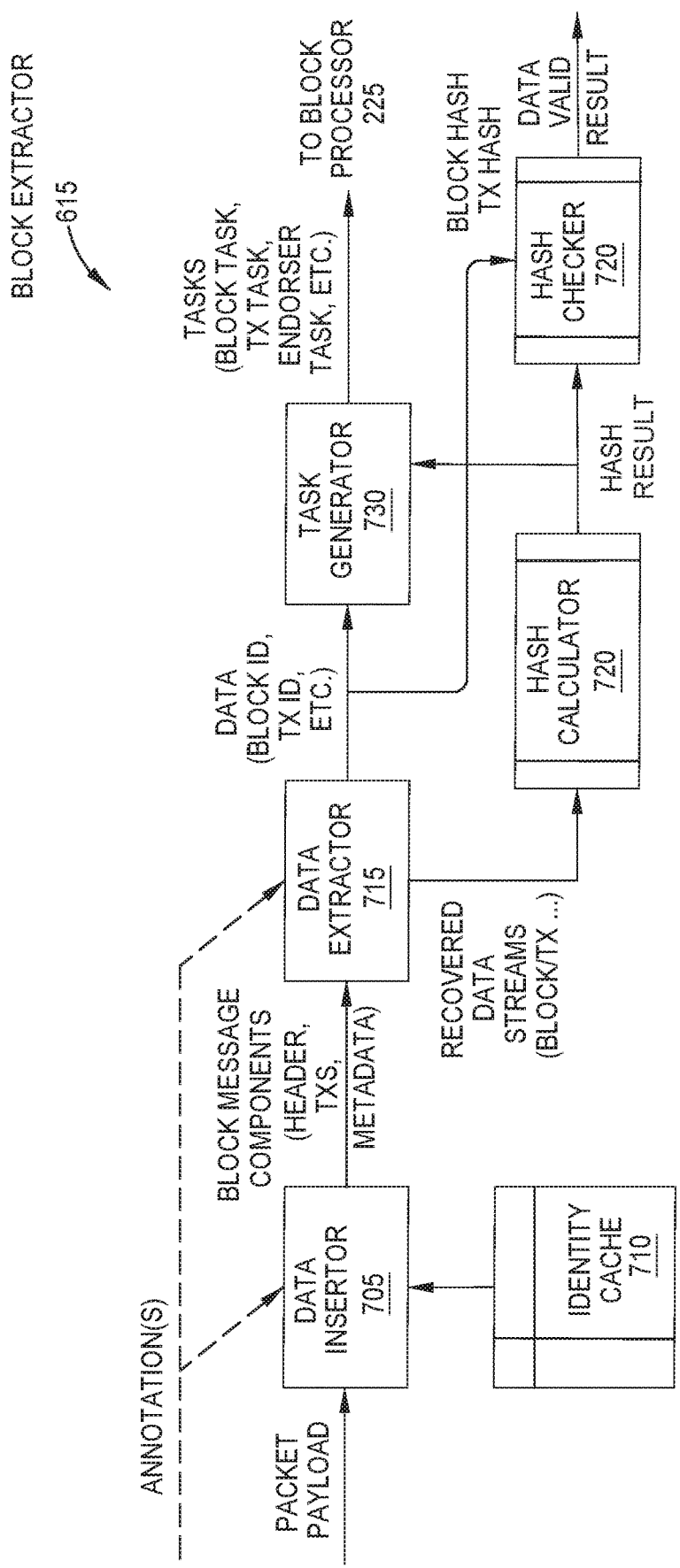
FIG. 7 is a block diagram of a block extractor in a protocol processor, according to an example.

Once the packets are received, however, the block extractor may need the certificates in order to validate the block (and the transactions in the block) and to ensure the syntax of the block and transaction is correct. Thus, the block extractor may reconstruct the components, which means the block extractor identifies and retrieves the certificates, FIG. 7 is a block diagram of the block extractor 615, according to an example. As shown, the block extractor 615 includes a data insertor 705 that receives the packet payload and the annotations to identify the certificate (or certificates) corresponding to that payload. For example, if the payload is block metadata, the payload may include an ID corresponding to a certificate of the orderer that prepared the block. If the payload includes a transaction, the payload may include an ID corresponding to the client that submitted the transaction and one or more IDs corresponding to endorsing nodes that endorsed the transaction. Thus, the data insertor 705 may identify multiple IDs in the payload.

Using the IDs, the data insertor 705 performs a lookup in an identity cache 710 to retrieve the signed certificates corresponding to the IDs. That is, when an orderer sends certificates to the accelerator, the accelerator stores those certificates (and their corresponding IDs) in the identity cache 710 so that these certificates can then be retrieved when validating a block of transactions.

Returning to the method 400, at block 415 the block extractor 615 reconstructs the separate components of the block. That is, as each payload is received, the block extractor 615 can retrieve the corresponding certificate. This is shown in FIG. 7 where the data insertor 705 transmits the retrieved certificate (or certificates) along with the other data in the payload to a data extractor 715.

The data extractor 715 may reconstruct the components in the block of transactions at different times. For example, during Time 1, the data extractor 715 reconstructs the header of the block using a first received packet, at Time 2, the data extractor 715 reconstructs the first transaction in the block using a second received packet, and so forth. Thus, the block extractor 615 can be pipelined so that different components in the block can be executing at different stages (e.g., different circuit modules) in the extractor 615 in parallel.

At block 420, a hash calculator 720 calculates hashes for the separator components in the block. In one embodiment, the hash calculator 720 generates a hash for the entire block, every transaction of the block, and every endorsement of each transaction. The hash calculator 720 may generate these hashes at different times. For example, the hash calculator 720 can generate a hash for a particular transaction (and hashes for all the endorsements associated with that transaction) when it receives a packet corresponding to the transaction. However, the hash calculator 720 may wait to calculate a hash for the entire block after it has received all the packets for the block.

At block 425, a hash checker 725 determines whether the hashes calculated by the hash calculator 720 match hashes in the packets. That is, the packets transmitted by the sender may contain previously calculated hashes (or at least pointers to hashes) that can be compared to the hashes generated by the hash calculator 720. For example, the sender may calculate hashes for the block, each transaction in the block, and each endorsement in the transactions and transmit those hashes to the accelerator 210. If those hashes match the local hashes generated by the hash checker 725, this means the messages are valid and the proper syntax for the block and transactions has been followed. If the hashes do not match, the method proceeds to block 445 where the hardware accelerator indicates the received data has a syntax error. In one embodiment, the hardware accelerator sends a reply message to the sender indicated the validation process has failed.

Assuming the hashes do match the received hashes, the method 400 proceeds to block 430 where the hardware accelerator indicates the received data was successfully parsed. In one embodiment, the response generator 605 in FIG. 6 transmits a reply or acknowledge (ACK) message to the sender indicating the block of transactions has been successfully received and processed by the protocol processor 220.

At block 435, a task generator 730 generates tasks for the block processor in order to complete the validation process. In one embodiment, the task generator 730 generates block tasks, transaction tasks, and endorser tasks. The block tasks may include a block ID, block signature (e.g., the certificate of the orderer that generated the block), etc. The transaction tasks may include a transaction ID, transaction signature (e.g., the certificate of the client that generated the transaction), transaction read/write sets, etc. In one embodiment, the task generator 730 generates a transaction task for each transaction in the block. The task generator 730 can also generate an endorser task for each endorsement in a transaction. That is, because each transaction can receive several endorsements, the task generator 730 may generate a task for each of those endorsements.

At block 440, the task generator 730 forwards the tasks and corresponding data to the block processor in the hardware accelerator. The block processor can then validate the block, transactions, and the endorsements. In general, the protocol processor (and its circuit components illustrated in FIGS. 5-7) parses the received packets to reformat the data of the block into a format that can be digested or processed by the block processor without the help of software. Thus, the validation process in a blockchain can be performed entirely by hardware, thereby reducing the time and compute resources needed for this process.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product.

Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A computing system, comprising:
   a processor;
   memory storing a ledger of a blockchain; and
   a hardware accelerator configured to:
     receive a plurality of packets corresponding to a block of transactions to be committed to the ledger;
     parse the plurality of packets to reconstruct different components of the block of transactions;
     generate hashes for the different components in the block of transactions; and
     upon determining the hashes match previously calculated hashes, generate tasks to validate the block of transactions in the hardware accelerator,
   wherein one of the processor or the hardware accelerator is configured to, upon determining the block of transactions is valid, commit the block of transactions to the ledger.

2. The computing system of claim 1, wherein the hardware accelerator comprises at least one of a system on a chip (SoC), a field programmable gate array (FPGA), or an application specific integrated circuit (ASIC).

3. The computing system of claim 2, wherein the SoC or FPGA comprises programmable logic.

4. The computing system of claim 2, wherein the ASIC comprises only hardened circuitry.

5. The computing system of claim 1, wherein the block of transactions comprises a block header, a plurality of transactions, and metadata, wherein the block header, each of the plurality of transactions, and the metadata are sent in a separate one of the plurality of packets.

6. The computing system of claim 5, wherein the plurality of packets does not contain signed certificates corresponding to the block or the plurality of transactions.

7. The computing system of claim 6, wherein the hardware accelerator comprises:
   an identity cache storing local copies of the signed certificates corresponding to approved nodes in the blockchain; and
   a data insertor configured to retrieve signed certificates corresponding to the block of transactions from the identity cache using IDs included in the plurality of packets.

8. The computing system of claim 7, wherein the hardware accelerator comprises:
   a data extractor configured to reconstruct the block of transactions using data in the plurality of packets and the retrieved signed certificates;
   a hash calculator configured to generate hashes corresponding to the block of transactions using the reconstructed block of transactions; and
   a hash checker configured to check whether the generated hashes match previously calculated hashes in order to ensure the block of transactions does not contain a syntax error.

9. An integrated circuit for accelerating a validation process for a blockchain, comprising:
   a data insertor configured to receive a plurality of packets corresponding to a block of transactions to be committed to a ledger of the blockchain;
   a data extractor configured to parse the plurality of packets and reconstruct different components of the block of transactions;
   a hash calculator configured to generate hashes for the different components in the block of transactions;

a hash checker configured to determine that the hashes match previously calculated hashes; and a task generator configured to generate tasks to validate the block of transactions.

10. The integrated circuit of claim 9, wherein the integrated circuit comprises at least one of a system on a chip (SoC), a field programmable gate array (FPGA), or an application specific integrated circuit (ASIC).

11. The integrated circuit of claim 10, wherein the SoC or FPGA comprises programmable logic.

12. The integrated circuit of claim 10, wherein the ASIC comprises only hardened circuitry.

13. The integrated circuit of claim 9, wherein the block of transactions comprises a block header, a plurality of transactions, and metadata, wherein the block header, each of the plurality of transactions, and the metadata are sent in a separate one of the plurality of packets, wherein the plurality of packets do not contain signed certificates corresponding to the block or the plurality of transactions.

14. The integrated circuit of claim 13, further comprising:
an identity cache storing local copies of the signed certificates corresponding to approved nodes in the blockchain,
wherein the data insertor is configured to retrieve signed certificates corresponding to the block of transactions from the identity cache using IDs included in the plurality of packets.

15. The integrated circuit of claim 14, further comprising:
a data extractor configured to reconstruct the block of transactions using data in the plurality of packets and the retrieved signed certificates,
wherein the hash calculator is configured to generate the hashes using the reconstructed block of transactions, and
wherein the hash checker is configured to check whether the generated hashes match the previously calculated hashes in order to ensure the block of transactions does not contain a syntax error.

16. A method, comprising:
receiving, at a hardware accelerator, a plurality of packets corresponding to a block of transactions to be committed to a ledger of a blockchain;
parsing, at the hardware accelerator, the plurality of packets to reconstruct components of the block of transactions;
calculating, at the hardware accelerator, hashes for the different components in the block of transactions;
determining, at the hardware accelerator, that the hashes match previously calculated hashes; and
generating, at the hardware accelerator, tasks to validate the block of transactions.

17. The method of claim 16, wherein the block of transactions comprises a block header, a plurality of transactions, and metadata, wherein the block header, each of the plurality of transactions, and the metadata are sent in a separate one of the plurality of packets.

18. The method of claim 17, wherein the plurality of packets does not contain signed certificates corresponding to the block or the plurality of transactions.

19. The method of claim 18, further comprising:
storing, in a cache in the hardware accelerator, local copies of the signed certificates corresponding to approved nodes in the blockchain,
retrieving signed certificates corresponding to the block of transactions from the identity cache using IDs included in the plurality of packets.

20. The method of claim 19, further comprising:
reconstructing the block of transactions using data in the plurality of packets and the retrieved signed certificates,
wherein the hashes are calculated using the reconstructed block of transactions, and
wherein the determining that the hashes match the previously calculated hashes indicates whether the block of transactions contains a syntax error.

* * * * *